April 26, 1966     F. H. DILL ETAL     3,248,671
LASERS UTILIZING INTERNAL REFLECTION TECHNIQUES
Filed Nov. 30, 1962

INVENTORS
FREDERICK H. DILL
RICHARD F. RUTZ
PETER P. SOROKIN

BY *Stephen J. Limanek*
ATTORNEY

United States Patent Office 3,248,671
Patented Apr. 26, 1966

3,248,671
LASERS UTILIZING INTERNAL REFLECTION TECHNIQUES
Frederick H. Dill, Putnam Valley, Richard F. Rutz, Cold Spring, and Peter P. Sorokin, Ossining, N.Y., assignors to International Business Machines Corporation, New York, N.Y., a corporation of New York
Filed Nov. 30, 1962, Ser. No. 241,389
1 Claim. (Cl. 331—94.5)

This invention relates to lasers of the solid state type and more particularly to the stimulated emission of radiation by carrier injection and recombination in a solid state element.

Optical masers or lasers, as the art has developed, generally involve the establishment of an artificial distribution of electrons at energy levels other than the natural distribution in a host environment through the application of a source of energy known as pumping energy. This results in a greater fraction of filled energy states at the higher levels than filled energy states at the lower levels, which condition is known as population inversion. The electrons present in the host environment in the artificial distribution then give up their energy and undergo a transition to a lower energy level. The released energy may be in the form of electromagnetic radiation which in the majority of devices seen thus far in the art has been either visible or infrared electromagnetic radiation.

In optical maser devices currently available in the art there is employed either a gas, such as helium-neon mixture or a crystal, such as, aluminum oxide or calcium fluoride, as the host environment, into which is placed appropriate impurities, for example, chromium or trivalent uranium, respectively, which respond to the pumping energy, permitting the population inversion of electrons between an excited state and a lower state of the impurities. The electrons in returning to the lower state of the impurity give off a quanta of light energy or photons in what is known in the art as radiative transition. When the density of these photons becomes large, the radiative transition probability increases, and in the presence of a population inversion, electromagnetic modes into which the photons are emitted, in turn, become more readily able to induce further emission therein. This is known in the art as stimulated emission of radiation and results in a narrowing of the emission line from the device. In the currently available optical maser device, electrical power is converted to optical power, pumping light or an electrical discharge, which, in turn, is used to establish the population inversion in the host crystal.

It has been discovered that laser action or stimulated emission of radiation can be imparted to a suitable solid state material by injecting carriers at a sufficient rate and permitting those carriers to recombine. When this injection carrier rate is achieved, a resulting narrowing of the output light emission line occurs. Stimulated emission of radiation is imparted to a solid state material which has an energy gap and which exhibits a radiative energy transsition upon the release of energy by carrier recombination therein by injecting carriers into the solid state material in a density sufficient to overcome the losses in the solid state environment. More particularly, stimulated emission of radiation has been imparted to a semiconductor device by the fabrication of a P-N junction in the device which is appropriately forward biased at a given injected carrier current density sufficiently high to overcome various non-radiative electron recombination and various radiation loss mechanisms in the host semiconductor crystal. When these conditions are satisfied, the light output from an active layer at the P-N junction of the crystal, as a result of the released energy through recombination of the injected carriers, concentrates itself into a single predominating mode at the expense of all other output modes in the system, as described in more detail in commonly assigned copending U.S. patent application, Serial No. 230,607, Burns et al., filed October 15, 1962, and entitled "Stimulated Emission of Radiation in Solid State Devices."

It also has been discovered that laser action or stimulated emission or radiation is enhanced in injection lasers by exciting a particular mode in the laser by providing a pair of parallel smooth opposite faces on the semiconductor device, as described in more detail in commonly assigned copending U.S. patent application having Serial No. 234,150, filed October 30, 1962, and entitled "Semiconductor Laser With Optical Cavity."

It is an object of this invention to provide stimulated emission of radiation in an improved solid state device.

Another object of this invention is to provide an improved coherent light emitting solid state structure.

A further object of this invention is to provide a solid state structure emitting light in a preferred optical mode.

Yet a further object of this invention is to provide a more efficient injection laser.

Yet another object of this invention is to provide an improved solid state device exhibiting a sharp narrowing of the emission line width for injected density values having a lower threshold.

Still a further object of this invention is to provide an improved coherent light emitting semiconductor structure having a geometrical configuration which enhances the emission of a preferred optical mode.

Still another object of this invention is to provide a coherent light emitting semiconductor structure having a lower current threshold at which stimulated emission occurs.

In accordance with the present invention an injection laser is provided which includes a thin active layer at the P-N junction of a semiconductor device having an index of refraction and a geometrical configuration such that photons or optical rays are internally reflected therein by surfaces or faces disposed perpendicular to the active layer at angles greater than the critical angle until they arrive at an output area in a predetermined location on a surface of the semiconductor device, and which further includes a P region and an N region having an index of refraction substantially similar to the index of refraction of the material of the active layer.

An important advantage of this invention is that a high Q resonator is provided in an injection laser by totally reflecting selected rays before these rays arrive at the output of the laser so as to reduce the amount of current required to produce stimulated emission in the laser.

An important feature of the laser of the present invention is that a high Q resonator is provided for injection lasers which does not require the application of silver or multiple dielectric layers to surfaces of the active layer.

The foregoing and other objects, features and advantages of the invention will be apparent from the following more particular description of preferred embodiments of the invention, as illustrated in the accompanying drawings.

Figure 4:
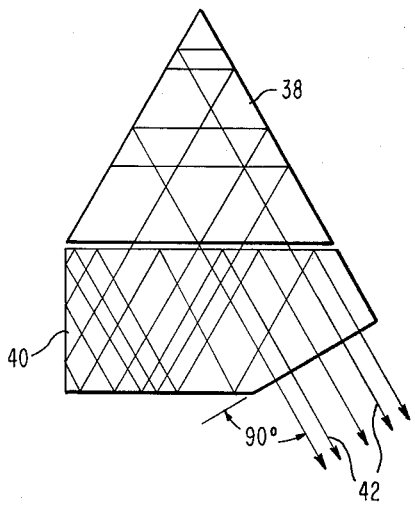
Figure 5:
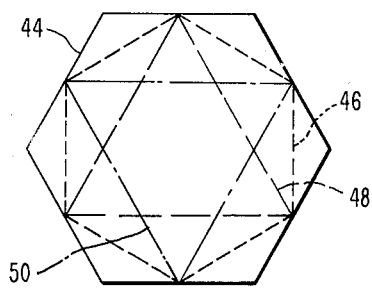

FIG. 4 indicates an injection laser having a triangularly shaped active layer and an optical output coupler, and FIG. 5 indicates an injection laser having a hexagonally shaped active layer.

Figure 1:
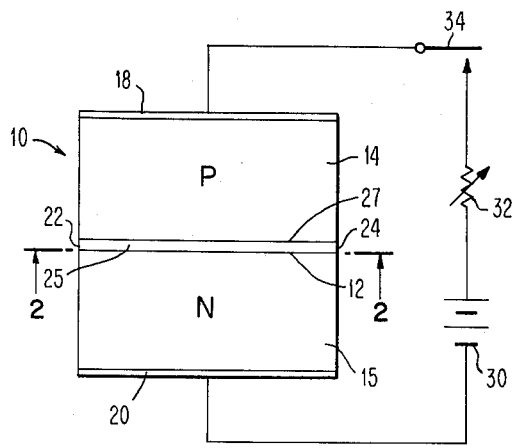
FIG. 1 illustrates an embodiment of an injection laser of the present invention.
Figure 2:
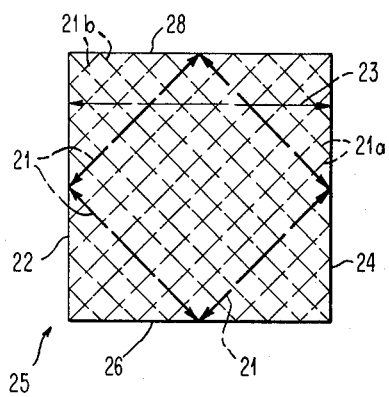
FIG. 2 is a view of the active layer of the laser of FIG. 1 taken in a horizontal plane passing through line 2—2 and an indication of the light path distribution therein of a preferred mode.

Referring to the drawings in more detail, there is illustrated in FIG. 1 one embodiment of the injection laser of the present invention. The device of FIG. 1 is made up of a semiconductor crystal 10 containing a P–N junction 12, having a square area as indicated in FIG. 2 of the drawing, separating a P region 14 and an N region, 15, the regions 14 and 15 having at least substantially similar indice of refraction. A first electrode or ohmic contact 18, which may be made of indium is disposed on the P region 14 and a second electrode or ohmic contact 20, which may be gold antimony plated Kovar, is placed into contact with the N region 16. The electrodes 18 and 20 are preferably metallic sheets forming place surfaces which are mutually parallel. The device is constructed so as to have the P–N junction plane horizontally disposed as indicated in FIG. 1 and essentially parallel to the planes of the electrodes 18 and 20, and all other adjacent surfaces 22, 24, 26 and 28, indicated more clearly in FIG. 2, of the semiconductor 10 are in planes at 90° to each other and are optically flat. Crystals 10 which have operated successfully were gallium arsenide P–N junctions cleaved out of a 6 mil zinc diffused wafer having 5 mil sides and with the top and bottom surfaces being (100) planes.

The opposite surfaces 22 and 24 and the opposite surfaces 26 and 28 may be made optically flat and parallel to each other by any known process, for example, grinding and polishing, but, it is preferred that these surfaces be made optically flat and parallel to each other by employing the cleavage technique taught in commonly assigned co-pending U.S. patent application, Serial No. 234,141, "Method of Fabrication of Crystalline Shapes," filed by R. Rutz and F. Dill on October 30, 1962. In accordance with the cleavage technique, crystalline shapes having very high precision optically flat faces related to exact geometries and spacing are achieved by supporting the crystal on a broad area crystallographic face that is perpendicular to a crystallographic plane having a minimum bond and then applying a cleavage force to crystal along the minimum bond crystallographic plane. When a rectangular parallelepiped crystal body of gallium arsenide is to be formed, the gallium arsenide crystal body is supported parallel to the (100) crystallographic plane thereof and a force is applied perpendicular to the (100) crystallographic plane along the (110) crystallographic plane of the gallium arsenide crystal.

The electrodes 18 and 20 are appropriately connected to a power source illustrated as a battery 30, a variable series impedance 32 and a switch 34 which serve to selectively apply a forward bias to the P–N junction 12 to provide a current density above the threshold current density of the device illustrated.

In the operation of the device illustrated in FIG. 1 of the drawing, when the switch 34 is closed, photons are generated by the injected carriers, as described in the above-identified U.S. patent application Serial No. 230,607, in a thin active layer 25 having an upper surface 27 generally within the P region, a lower surface at the P–N junction 12 and the side surfaces 22, 24, 26 and 28. The photons generated in the active layer 25 travel from their points of origin in many different directions, and tend to set up modes in these many different directions. However, the mode which will first become established in the laser so as to produce stimulated emission is the mode which is set up by a resonator having the highest Q. The Q may be considered as the ratio of the intensity of the EM energy of the optical waves and the power loss per unit volume of the crystal. Rays traveling in the crystal for only a short distance before they pass into the medium surrounding the active layer 25 do not readily produce stimulated emission in the crystal and, therefore, the crystal provides a low Q for these rays. In a crystal of the type shown in FIG. 1 a large number of rays strike the surfaces 12, 22, 24, 26, 27 and 28 of the active layer 25 at angles greater or less than the critical angle determined by the relative indices of refraction of the active layer 25 and any material surrounding this layer 25. It can be seen in FIG. 2 that if the path of a ray is that indicated by the heavy line 21 and if the angle of incidence of the ray is greater than the critical angle, the active layer 25 provides a high Q for the rays following the path 21 since the rays will be totally reflected at each of the four faces of the active layer 25 when the surfaces 22, 24, 26 and 28 are optically smooth and each of the faces is disposed 90° with respect to its adjacent face.

Assuming the rays in the path 21 shown in FIG. 2 have an angle of incidence of 45°, if 45° is greater than the critical angle of the material of the active layer 25, the ray is internally reflected with little, approximately 1 part in one million, or no loss of energy. On the other hand if rays are internally incident at an angle less than the critical angle they are partially transmitted out of the active layer 25. If rays are internally incident at an angle only slightly greater than the critical angle the reflected amplitude is substantially the same as the incident amplitude.

It can be seen in FIG. 2 that the rays in path 21 having an angle of incidence of 45° which is greater than the critical angle of the material of the active layer 25 are successively reflected by each of the surfaces 22, 24, 26 and 28 and since there is little or no loss of energy of these rays, the active layer 25 provides a high Q for the rays in path 21. It can also be seen in FIG. 2 that there are many other equivalent paths, for example paths 21a and 21b, parallel to path 21 along which rays travel which provide the same angles of incidence for rays traveling therein. Thus, by passing a sufficient current density through the active layer 25 a mode field is first produced in the active layer 25 having the pattern indicated in FIG. 2 which will produce stimulated emission. Of course, modes other than that indicated in FIGURE 2 by paths 21, 21a and 21b, will tend to establish themselves in the active layer 25 but none of these other modes will be capable of producing stimulated emission at the low threshold at which stimulated emission is produced by the mode of paths 21, 21a and 21b of FIG. 2. It can be seen that a mode will tend to establish itself between surfaces 22 and 24 as indicated by the horizontal line and as described more fully in the above mentioned U.S. patent application, Serial No. 234,150. However, since the surfaces 22 and 24 reflect only about 30 to 40 percent of the incident light high losses are encountered providing a low Q resonator. For similar reasons the surfaces 26 and 28 also form a low Q resonator. It should be noted that after a first mode produces stimulated emission a large fraction of the input energy to the laser is directed to sustaining this mode and it is then difficult for other modes to produce stimulated emission.

Since, as stated hereinabove, the P region and the N region are made of material having substantially the same index of refraction, it can be seen that modes similar to that indicated by paths 21, 21a and 21b but which lie in a plane having a vertical component will not be readily sustained in the laser of the present invention since this energy will walk off into the inactive portions of the crystal 10, i.e., into the P region 14 above surface 27 and into the N region 15 below the P–N junction 12, where it becomes absorbed.

Figure 3:
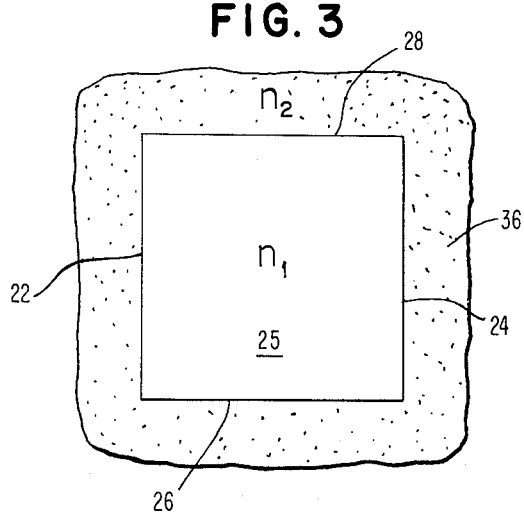
FIG. 3 illustrates the active layer of the laser of FIG. 1 surrounded by a material having an index of refraction intermediate that of the active layer and that of air.

In order to minimize the number of possible modes that can be excited in a laser having the square horizontal active layer 25 shown in FIGS. 1 and 2 of the drawing the index of refraction should be equal to about 1.4 so that only those rays are repeatedly reflected which are greater than but close to the critical angle of 45°. However, when laser material having the preferred index of refraction is unavailable the mode selectivity may be enhanced by surrounding the sides of the active layer with a material having an index of refraction intermediate that of the active layer 25 and air. Gallium arsenide has an index of refraction $n_1$ of approximately 4, therefore, material 36 surrounding the active layer 25, as shown in FIG. 3 of the drawing, should have an index of refraction $n_2$ of approximately 2.8.

The embodiment of the injection laser of the present invention has been hereinabove described as a laser with a square horizontal active area. It should be understood that lasers having other geometrical cross-sectional configurations also may be used in which modes set up by internal reflection techniques are utilized. However, in order to minimize the number of possible modes in each instance the index of refraction $n_1$ should be equal to $$\frac{1}{\sin\left(\frac{(N-2)\pi}{2N}\right)}$$

where N is equal to the number of sides of the polygon. If the active layer 25 is surrounded in a medium having an index of refraction $n_2$, the ratio of $n_1/n_2$ should be equal to $$\frac{1}{\sin\left(\frac{(N-2)\pi}{2N}\right)}$$

The active layer 25 of the laser of the present invention illustrated in FIGS. 1 and 2 has been described as a resonator having a high Q. It should be understood that the coherent radiation produced in the active layer 25 illustrated in FIGS. 1 and 2 may be coupled out of a surface of the layer 25. This perturbation may take the form of, for example, a protuberance on or a groove in the active layer to direct the radiation into the surrounding medium in any known manner, for example, as more completely described in commonly assigned co-pending U.S. patent application, Serial No. 144,187 and Serial No. 144,080 filed October 10, 1961, and entitled, "Lasers." Alternatively, the coherent radiation may be coupled out of an active layer 38, shown in FIG. 4 of a laser, shown in the drawing as having a triangular horizontal active area, by positioning to within about one wavelength of one surface thereof a body of optic material 40 having an index of refraction similar to that of the active layer 38, for example, gallium arsenide, and having a geometry suitable for direction radiation therethrough to form a single beam 42 of optical energy.

In FIG. 5 of the drawing there is indicated a laser of present invention having an active layer 44 with a regular hexagonal cross-sectional area wherein three separate internally reflected modes can be set up. The first mode indicated by a dotted line 46 is internally reflected by each of the side surfaces of the active layer 44, the second mode indicated by the dash line 48 is internally reflected by only three alternate surfaces of the layer 44 and the third mode indicated by the dash-dot line 50 is internally reflected by the remaining three alternate surfaces of the layer 44. It can be seen that by utilizing a suitable low relative index of refraction the second and third modes 48 and 50 can be effectively damped out so as to permit stimulated emission in only the first mode 46. Mode 46 can be suppressed by notching at the vertices to intersect path 46, causing modes 48 and 50 to be favored. Furthermore, it can be seen that the second and third modes, 48 and 50, are optically independent and, therefore, each of these modes can be separately coupled out of the laser illustrated in FIG. 5 by using, for example, two optical couplers of the type illustrated in FIG. 4 of the drawing.

It should be understood that the invention is not limited to the geometrical configurations hereinabove illustrated or described. Any geometrical configuration may be utilized which will provide internal reflections of the rays a sufficient number of times to produce stimulated emission when suitable threshold currents are employed. The smoothness and arrangement of the reflecting faces of the active layers should be such that the internal reflections of a ray are readily produced a large number of times. Furthermore, the index of refraction of the material and the geometrical configuration of the active layer may be such that the useful rays in the laser operation strike successive or adjacent surfaces of the active layer or follow a path which bypasses one or more intermediate faces between two successive reflecting points. It is also to be understood that the injection lasers are commonly operated in very low temperature environments.

While the invention has been particularly shown and described with reference to preferred embodiments thereof, it will be understood by those skilled in the art that various changes in form and details may be made therein without departing from the spirit and scope of the invention.

What is claimed is:

An injection laser comprising:
a semiconductor crystal having two regions of substantially the same index of refraction and of opposite conductivity type joined at a p-n junction lying in a given first plane and having optically smooth surfaces disposed in planes perpendicular to said first plane;
means for passing electrical current across said p-n junction to provide stimulated emission of radiation in said crystal;
said surfaces being disposed to form a resonant cavity substantially totally reflecting said radiation;
said surfaces being arranged to form said cavity as a hexagon for supporting at least two independent optical modes of said radiation which employ different surfaces of said hexagon and;
means for coupling said radiation through one of said surfaces.

References Cited by the Examiner

UNITED STATES PATENTS

| Re. 25,632 | 8/1964 | Boyle et al. | 331—94.5 |
|---|---|---|---|
| 3,140,451 | 7/1964 | Fox | 331—94.5 |
| 3,153,691 | 10/1964 | Kibler. | |
| 3,158,746 | 11/1964 | Lehovec | 88—61 X |

OTHER REFERENCES

Bergstein et al.: "A Total Reflection Solid-State Optical Maser Resonator," Proc. IRE, vol. 50, No. 8, page 1833 (August 1962).

Technical Bulletin T-1261-1, Trion Instruments, Inc., Dec. 4, 1961.

JEWELL H. PEDERSEN, *Primary Examiner.*

LAWRENCE ORLOFF, *Assistant Examiner.*